United States Patent
An et al.

(10) Patent No.: US 10,162,541 B2
(45) Date of Patent: Dec. 25, 2018

(54) ADAPTIVE BLOCK CACHE MANAGEMENT METHOD AND DBMS APPLYING THE SAME

(71) Applicant: Korea Electronics Technology Institute, Seongnam-si, Gyeonggi-do (KR)

(72) Inventors: Jae Hoon An, Incheon (KR); Young Hwan Kim, Yongin-si (KR); Chang Won Park, Hwaseong-si (KR)

(73) Assignee: Korea electronics technology institute, Seongnam-si, Gyeonggi-do (KR)

( * ) Notice: Subject to any disclaimer, the term of this patent is extended or adjusted under 35 U.S.C. 154(b) by 0 days.

(21) Appl. No.: 15/465,605

(22) Filed: Mar. 22, 2017

(65) Prior Publication Data

US 2017/0293441 A1    Oct. 12, 2017

(30) Foreign Application Priority Data

Apr. 11, 2016   (KR) .................. 10-2016-0043959

(51) Int. Cl.
  *G06F 3/06*        (2006.01)
  *G06F 12/0846*     (2016.01)
  *G06F 12/0868*     (2016.01)
  *G06F 12/0871*     (2016.01)
  *G06F 17/30*       (2006.01)

(52) U.S. Cl.
  CPC .......... *G06F 3/0619* (2013.01); *G06F 3/0665* (2013.01); *G06F 3/0689* (2013.01); *G06F 12/0848* (2013.01); *G06F 12/0868* (2013.01); *G06F 12/0871* (2013.01); *G06F 17/30312* (2013.01); *G06F 2212/282* (2013.01); *G06F 2212/312* (2013.01); *G06F 2212/502* (2013.01)

(58) Field of Classification Search
  None
  See application file for complete search history.

(56) References Cited

U.S. PATENT DOCUMENTS

| | | | | |
|---|---|---|---|---|
| 5,632,038 A | * | 5/1997 | Fuller | ................... G06F 1/3203 713/324 |
| 6,442,652 B1 | * | 8/2002 | Laboy | ................. G06F 12/0888 455/12.1 |
| 7,694,075 B1 | * | 4/2010 | Feekes, Jr. | .......... G06F 12/0888 711/119 |

(Continued)

FOREIGN PATENT DOCUMENTS

| | | |
|---|---|---|
| JP | 4313068 B2 | 8/2009 |
| KR | 1020060069063 A | 6/2006 |

OTHER PUBLICATIONS

Korean Office Action dated Jan. 22, 2018, issued in corresponding Korean Patent Application No. 10-2016-0043959.

*Primary Examiner* — Kevin Verbrugge
(74) *Attorney, Agent, or Firm* — Hauptman Ham, LLP

(57) ABSTRACT

An adaptive block cache management method and a DBMS applying the same are provided. A DB system according to an exemplary embodiment of the present disclosure includes: a cache configured to temporarily store DB data; a disk configured to permanently store the DB data; and a processor configured to determine whether to operate the cache according to a state of the DB system. Accordingly, a high-speed cache is adaptively managed according to a current state of a DBMS, such that a DB processing speed can be improved.

11 Claims, 4 Drawing Sheets

(56) References Cited

U.S. PATENT DOCUMENTS

| | | | | |
|---|---|---|---|---|
| 8,230,286 | B1* | 7/2012 | Foley | G06F 11/076 |
| | | | | 714/44 |
| 9,146,875 | B1* | 9/2015 | Boyle | G06F 12/0866 |
| 9,727,465 | B2* | 8/2017 | Hiniker-Roosa | G06F 12/0831 |
| 2004/0039886 | A1* | 2/2004 | Christofferson | G06F 12/0888 |
| | | | | 711/156 |
| 2005/0257005 | A1* | 11/2005 | Jeddeloh | G06F 12/0215 |
| | | | | 711/115 |
| 2007/0162693 | A1* | 7/2007 | Nam | G06F 12/0866 |
| | | | | 711/113 |
| 2008/0246857 | A1* | 10/2008 | Hayashi | H04N 1/2112 |
| | | | | 348/231.9 |
| 2012/0131278 | A1* | 5/2012 | Chang | G06F 12/0893 |
| | | | | 711/118 |
| 2013/0124799 | A1* | 5/2013 | Hiniker-Roosa | G06F 12/0831 |
| | | | | 711/118 |
| 2014/0229683 | A1* | 8/2014 | Hiniker-Roosa | G06F 12/0831 |
| | | | | 711/144 |
| 2015/0046648 | A1* | 2/2015 | Anderson | G06F 12/0802 |
| | | | | 711/118 |
| 2015/0269179 | A1* | 9/2015 | McClements | G06F 12/084 |
| | | | | 711/130 |
| 2015/0324135 | A1* | 11/2015 | Chan | G06F 3/061 |
| | | | | 711/114 |
| 2016/0203083 | A1* | 7/2016 | Park | G06F 12/0806 |
| | | | | 711/122 |

* cited by examiner

ADAPTIVE BLOCK CACHE MANAGEMENT METHOD AND DBMS APPLYING THE SAME

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on Apr. 11, 2016, and assigned Ser. No. 10-2016-0043959, the entire disclosure of which is hereby incorporated by reference.

Technical Field of the Invention

The present disclosure relates generally to a database management system (DBMS), and more particularly, to a DBMS which uses an in-memory DB.

Background of the Invention

An in-memory DB refers to a memory-based DB which is established/managed in a memory, and guarantees a fast response speed, compared with an existing disk-based DB. However, since a volatile memory is used, there is a need for a means for guaranteeing reliability by restoring the DB when an unexpected disorder occurs.

To achieve this, the in-memory DB generates an intermediate restore file (intermediate store file) to be used for restoring DB data at regular intervals, and stores the intermediate restore file in a disk. However, in the process of generating/storing the intermediate restore file, there may be problems, such as a delay in processing the in-memory DB, performance deterioration, or the like, due to data input/output (I/O) between the memory and the disk.

Therefore, there is a need for a method for stably generating/storing an intermediate restore file of an in-memory DB without causing a problem in processing the in-memory DB.

SUMMARY OF THE INVENTION

To address the above-discussed deficiencies of the prior art, it is a primary aspect of the present disclosure to provide a method for adaptively managing a high-speed cache according to a current state of a DBMS, as a solution to prevent problems which may be caused by generation and storage of an intermediate restore file, such as a delay in processing an in-memory DB, performance deterioration, or the like, and a DB system applying the same.

Another aspect of the present disclosure is to provide a method for adaptively managing a high-speed cache according to a current state of a DBMS, as a solution to improve a DB processing speed, and a DB system applying the same.

According to one aspect of the present disclosure, a database (DB) system includes: a cache configured to temporarily store DB data; a disk configured to permanently store the DB data; and a processor configured to determine whether to operate the cache according to a state of the DB system.

In addition, the state of the DB system may include at least one of a use rate of the processor and a use rate of a memory provided in the DB system.

In addition, the memory may include: a first memory in which the DB is established; and a second memory which is used by the processor to process data.

In addition, the use rate of the memory may include at least one of a use rate of the first memory and a use rate of the second memory.

In addition, the state of the DB system may include at least one of a data I/O rate of the first memory and a data I/O rate of the second memory.

In addition, the processor may be configured to store, in the cache, a restore file regarding the DB established in the memory.

In addition, when the state of the DB system is a first state, the processor may be configured to store the restore file in the cache, and, when the state of the DB system is a second state, the processor may be configured to store the restore file in the disk.

In addition, the processor may be configured to determine whether to operate the cache according to current date and time.

In addition, the processor may be configured to determine whether to operate the cache according to a type of the DB.

According to another aspect of the present disclosure, a method for managing a DB includes: monitoring a state of a DB system; determining whether to operate a cache, which temporarily stores DB data, according to the state; and operating a disk which permanently stores the DB data and the cache according to a result of the determining.

According to another aspect of the present disclosure, a DB system includes: a memory in which a DB is established; a cache configured to temporarily store DB data; a disk configured to permanently store DB data; and a processor configured to determine a storage medium to store a restore file of the DB from among the cache and the disk based on a state of the DB system, and store the restore file in the determined storage medium.

According to another aspect of the present disclosure, a method for managing a DB includes: establishing a DB in a memory of a DB system; determining a state of the DB system; and storing a restore file of the DB in any one of a cache or a disk based on the state.

According to exemplary embodiments of the present disclosure described above, a high-speed cache is adaptively managed according to a current state of a DBMS, such that problems which may be caused by generation and storage of an intermediate restore file, such as a delay in processing an in-memory DB, performance deterioration, or the like, can be prevented.

Furthermore, according to exemplary embodiments of the present disclosure, a high-speed cache is adaptively managed according to a current state of a DBMS, such that a DB processing speed can be improved.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
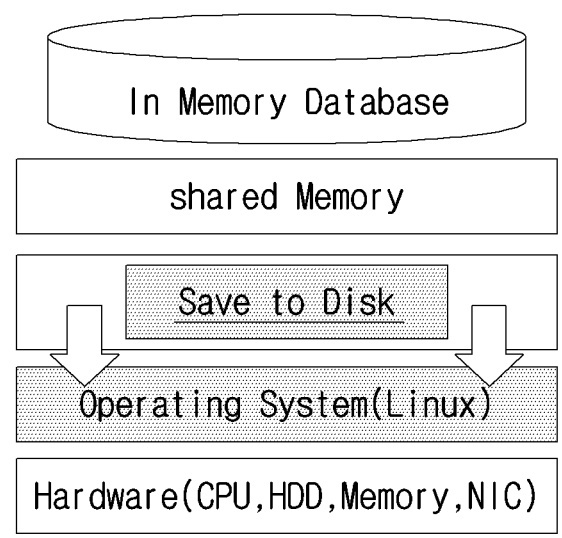
FIG. 1 is a view schematically showing a structure of a DBMS to which the present disclosure is applicable.

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

FIG. 1 is a view schematically showing a structure of a database management system (DBMS) to which the present disclosure is applicable. In the embodiments of the present disclosure, a Scale Out DBMS environment is illustrated. However, this is merely an example and the technical idea of the present disclosure can be applied to other DBMS environments.

As shown in FIG. 1, the DBMS includes an in-memory DB, a shared memory, a disk, an operating system (OS), and hardware (H/W).

From among components listed in the H/W, a central processing unit (CPU) is a processor for operating the OS, and a network interface card (NIC) is a means for exchanging data with external devices and systems via a network.

The in-memory DB is a memory in which a DB is established/managed, and the shared memory provides a storage space required by the CPU to execute the OS and process DB data.

Figure 2:
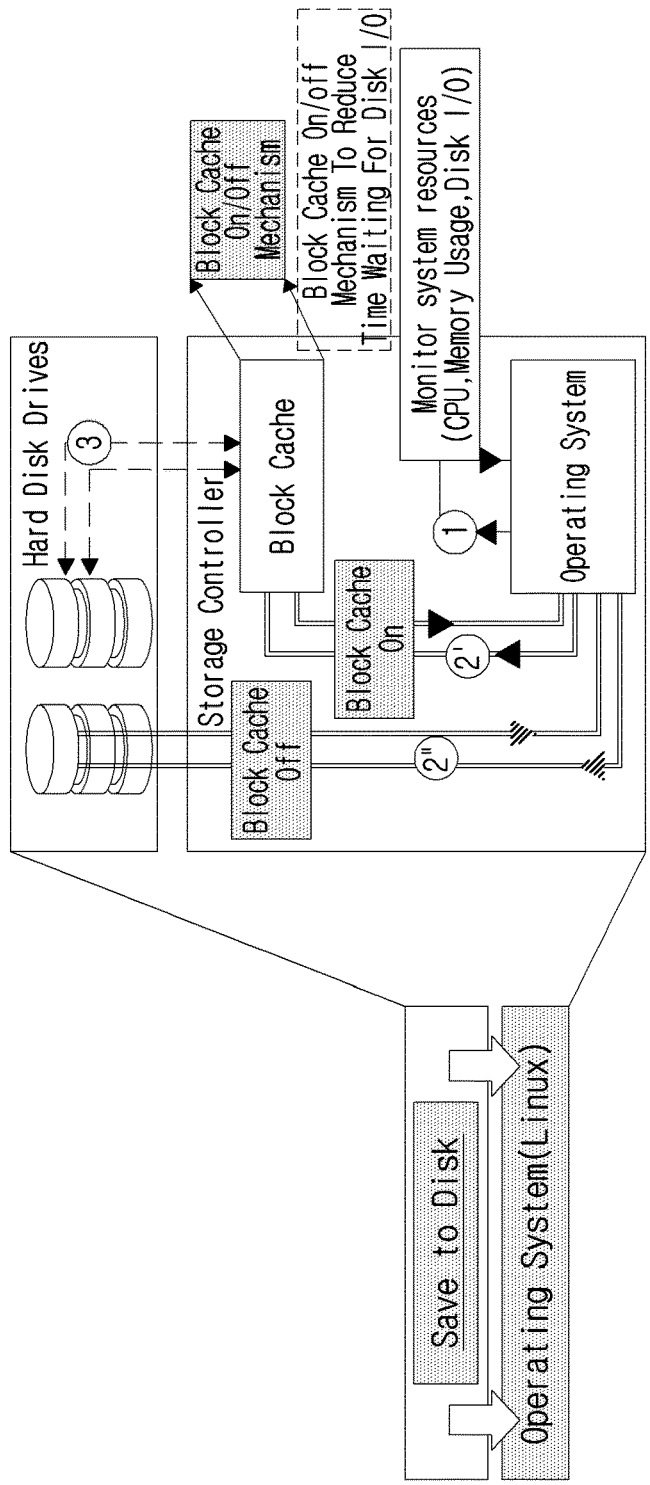
FIG. 2 is a view showing a detailed structure of a disk and a method for managing a disk in detail.

FIG. 2 illustrates a detailed structure of a disk and a method for managing a disk in detail. As shown in FIG. 2, the disk further includes a block cache in addition to a hard disk drive (HDD).

The HDD is a storage medium for permanently storing DB data. That is, the DB established/managed in the in-memory DB is ultimately stored in the HDD permanently. In addition, an intermediate restore file necessary for restoring the in-memory DB is stored in the HDD.

The block cache is a storage medium for temporarily storing DB data and is implemented by using a solid state device (SSD), which can access rapidly and can store and respond faster than the HDD. The block cache has data blocks of a high hit rate stacked therein.

In addition, in an embodiment of the present disclosure, the CPU stores the intermediate restore file in the block cache rather than in the HDD. This is to generate and store the intermediate restore file of the in-memory DB rapidly and ultimately to process the in-memory DB at high speed.

When the block cache is used under normal circumstances, that is, in the case where the state of the DBMS is normal, the in-memory DB is processed faster. However, when the block cache is used, data I/O is generated between the memory and the block cache and between the block cache and the HDD.

The generation of the double data I/O described above may reduce the processing speed of the DBMS and eventually may cause a delay in processing the in-memory DB. For example, when a DB transaction of a large scale is conducted, numerous simultaneous data change requests are received from clients.

That is, the operation of the block cache may give rise to an overhead in the DBMS.

Therefore, the DBMS according to an exemplary embodiment of the present disclosure monitors a current state of the DBMS and adaptively manages the block cache according to a result of the monitoring as shown in FIG. 2.

Specifically, a storage controller shown in FIG. 2 monitors resources of the DBMS and adaptively/variably manages the block cache. The storage controller is a program that is executed by the CPU.

To achieve this, the storage controller monitors 1) a use rate of the CPU, a memory use rate, and 3) a data I/O rate on a real time basis.

The memory use rate may include both a use rate of the in-memory DB and a use rate of the shared memory, or only one of them.

The data I/O rate includes at least one of a data I/O rate between the memory and the block cache, a data I/O rate between the block cache and the HDD, a data I/O rate between the memory and the HDD, and a data I/O rate between the NIC and the network.

When at least one of the CPU use rate, the memory use rate, and the data I/O rate corresponds to a predetermined overhead condition as a result of the monitoring, the storage controller inactivates the block cache (Off).

This is because the overhead occurs in the DBMS due to the operation of the block cache. When the block cache is inactivated (Off), DB data is inputted and outputted between the in-memory DB and the HDD, and the intermediate restore file is directly stored in the HDD.

On the other hand, when the result of the monitoring does not correspond to the overhead condition, the storage controller activates the block cache (On). This is a case in which the overhead does not occur in the DBMS due to the operation of the block cache, and the operation of the block cache makes it possible to perform high-speed processing.

When the block cache is activated (On), DB data is inputted and outputted between the in-memory DB and the block cache, and the intermediate restore file is stored in the block cache. In addition, the DB data and the intermediate restore file are delivered between the block cache and the HDD.

Figure 3:
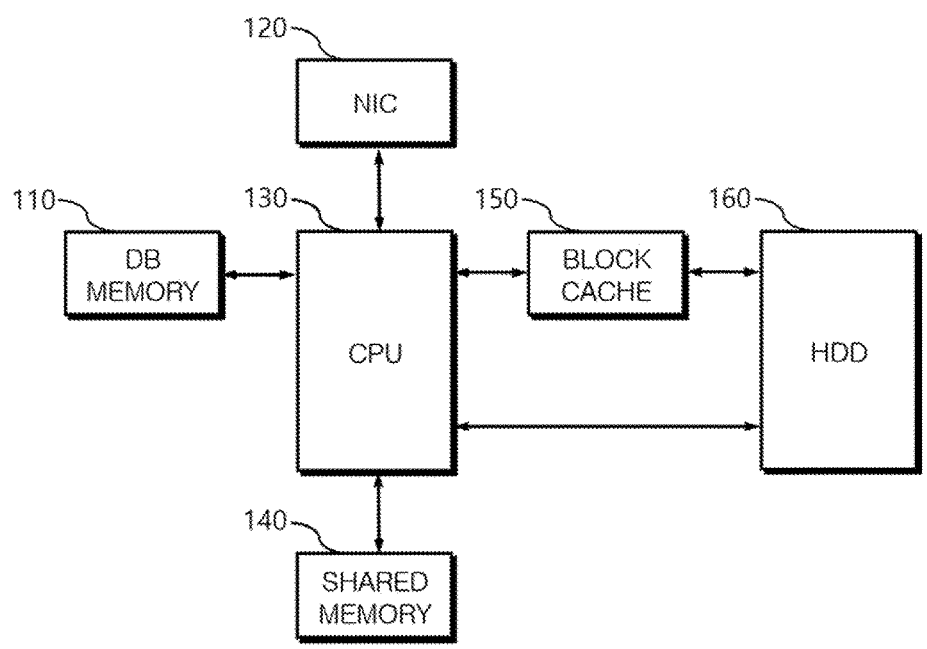
FIG. 3 is a block diagram of a DBMS according to an exemplary embodiment of the present disclosure.

FIG. 3 is a block diagram of a DBMS according to an exemplary embodiment of the present disclosure. The DBMS according to an exemplary embodiment of the present disclosure includes a DB memory 110, an NIC 120, a CPU 130, a shared memory 140, a block cache 150, and an HDD 160 as shown in FIG. 3.

The DB memory 110 is a volatile storage medium in which an in memory DB is established/managed, and the block cache 150 is a high-speed SSD which temporarily stores DB data and an intermediate restore file. The HDD 160 is a high capacity disk which permanently stores the DB data and the intermediate restore file.

The CPU 130 establish/manages the in-memory DB by executing the above-described OS, monitors the state of the DBMS by executing a storage controller, and adaptively manages the block cache 150 according to a result of the monitoring.

The shared memory 140 provides a storage space which is required by the CPU 130 to execute the OS and the storage controller and to process the DB data, and the NIC 120 is connected to an external network to exchange data with clients and other systems.

Figure 4:
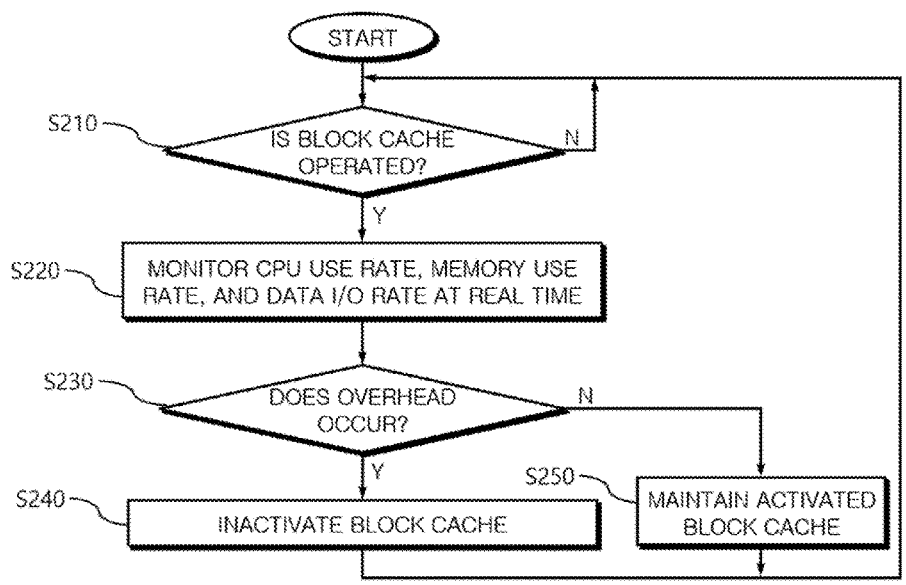
FIG. 4 is a flowchart to illustrate a method for adaptively managing a block cache of a DBMS according to another exemplary embodiment of the present disclosure.

FIG. 4 is a flowchart to illustrate a method for adaptively managing a block cache of a DBMS according to another exemplary embodiment of the present disclosure.

As shown in FIG. 4, when the block cache 150 is being operated (S210-Y), the CPU 130 monitors 1) a CPU use rate, 2) a memory use rate, and 3) a data I/O rate on a real time basis by executing the storage controller (S220).

In addition, the CPU 130 determines whether an overhead occurs in the DBMS due to the operation of the block cache as a result of the monitoring in step S220 (S230).

When it is determined that the overhead occurs (S230-Y), the CPU 130 inactivates the block cache 150 and does not operate the block cache 150 (S240).

On the other hand, when it is determined that the overhead does not occur (S230-N), the CPU 130 maintains the activation state of the block cache 150 and continues operating the block cache 150 (S250).

Up to now, the adaptive block cache management method for processing the in-memory DB at high speed, and the DBMS applying the same have been described with reference to preferred embodiments.

In the above-described embodiments, the adaptive management of the block cache 150 depends on the state of the DBMS. However, the technical idea of the present disclosure can be applied to other methods.

For example, the technical idea of the present disclosure can be applied to a case in which it is determined whether the block cache 150 is operated or not according to current date and time. For example, the block cache 150 may not be operated on a specific day or at a specific time.

Furthermore, the technical idea of the present disclosure can be applied to a case in which it is determined whether the block cache 150 is operated according to the type of the in-memory DB. For example, in the case of a DB for data analysis, the block cache 150 is operated, but, in the case of a data backup DB, the block cache 150 is not operated.

The technical idea of the present disclosure can be applied to a computer-readable recording medium which has a computer program recorded thereon to perform the apparatus and the method according to the present embodiments. In addition, the technical idea according to various exemplary embodiments of the present disclosure may be implemented in the form of a code which is recorded on a computer-readable recording medium and can be read by a computer. The computer-readable recording medium includes any data storage device which can be read by a computer and can store data. For example, the computer-readable recording medium may be a read only memory (ROM), a random access memory (RAM), a CD-ROM, a magnetic tape, a floppy disk, an optical disk, a hard disk drive, or the like. In addition, a computer-readable code or program which is stored in the computer-readable recording medium may be transmitted via a network connected between computers.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A database (DB) system comprising:
   a processor;
   a memory configured to store DB data;
   a cache storage device configured to store a restore file of the DB data; and
   a disk storage device having a disk storage, and configured to store the restore file of the DB data on the disk storage,
   wherein the cache storage device is faster than the disk storage device in access speed,
   wherein the processor is configured to store the restore file of the DB data to the disk storage device directly or using the cache storage device, and
   wherein the processor is configured to determine, according to a state of the DB system, whether to activate the cache storage device to store the restore file of the DB data to the disk storage device.

2. The DB system of claim 1, wherein the state of the DB system comprises at least one of a use rate of the processor and a use rate of the memory.

3. The DB system of claim 2, wherein the memory comprises:
   a first memory configured to store the DB data; and
   a second memory configured to provide a storage space for the processor to execute an operating system and process the DB data.

4. The DB system of claim 3, wherein the use rate of the memory comprises at least one of a use rate of the first memory and a use rate of the second memory.

5. The DB system of claim 3, wherein the state of the DB system comprises at least one of a data input/output (I/O) rate of the first memory and a data I/O rate of the second memory.

6. The DB system of claim 1, wherein the processor is configured to further determine whether to activate the cache storage device according to date and time.

7. The DB system of claim 1, wherein the processor is configured to further determine whether to activate the cache storage device according to a type of a database stored in the memory.

8. A method for managing a database (DB), the method performed by a database system comprising a processor, a memory configured to store DB data, a cache storage device, and a disk storage device, the method comprising:
   monitoring a state of the DB system;
   determining whether to activate the cache storage device, according to the state of the DB system; and
   storing a restore file of the DB data to the disk storage device directly or using the activated cache storage device, according to a result of the determining,
   wherein the cache storage device is faster than the disk storage device in access speed.

9. The method of claim 8, wherein the state of the DB system comprises at least one of a use rate of the processor and a use rate of the memory.

10. The method of claim 8, wherein the determining comprises:
    determining whether to activate the cache storage device according to date and time.

11. The method of claim 8, wherein the determining comprises:

determining whether to activate the cache storage device according to a type of a database stored in the memory.

* * * * *